(12) United States Patent
Owens

(10) Patent No.: US 7,819,462 B1
(45) Date of Patent: Oct. 26, 2010

(54) ANTI-INTRUSION BEAM FOR VEHICLE DOOR ASSEMBLY

(75) Inventor: John N. Owens, Franklin, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 2 days.

(21) Appl. No.: 12/427,374

(22) Filed: Apr. 21, 2009

(51) Int. Cl.
*B60J 5/00* (2006.01)

(52) U.S. Cl. .............................. 296/146.6; 296/187.12

(58) Field of Classification Search ............. 296/146.6, 296/187.12; 428/292.1
See application file for complete search history.

(56) References Cited

U.S. PATENT DOCUMENTS

| 3,868,796 A | 3/1975 | Bush |
| 5,580,120 A | 12/1996 | Nees et al. |
| 6,238,761 B1 | 5/2001 | Jeong et al. |
| 6,779,830 B2 | 8/2004 | Patberg et al. |
| 2003/0189357 A1 * | 10/2003 | Patberg et al. ........... 296/146.6 |

* cited by examiner

*Primary Examiner*—N. Edwards
(74) *Attorney, Agent, or Firm*—Reising Ethington P.C.

(57) ABSTRACT

One exemplary embodiment of an anti-intrusion beam for a vehicle door assembly may include a composite material. The composite material includes a fiber reinforcement with multiple fibers. The fibers may be oriented at an angle ranging between about 35 and 55 degrees when measured with respect to a lengthwise dimension of the anti-intrusion beam.

19 Claims, 1 Drawing Sheet

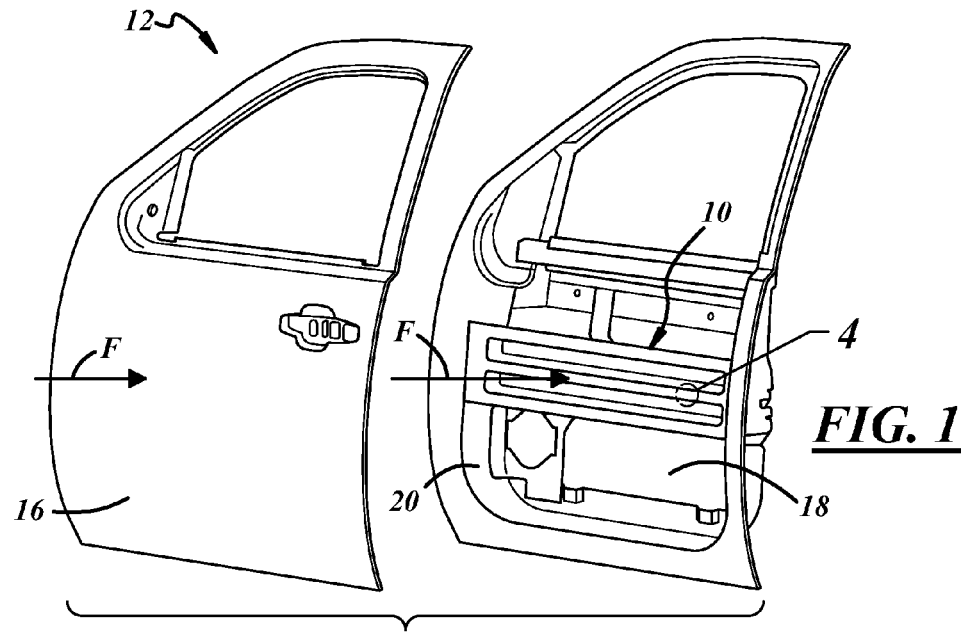
FIG. 1
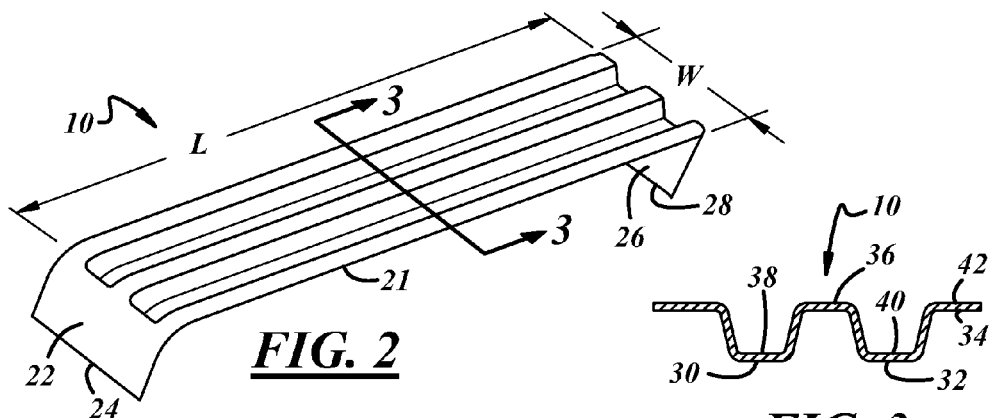
FIG. 2
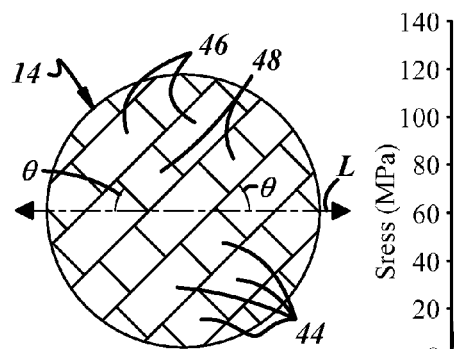
FIG. 3
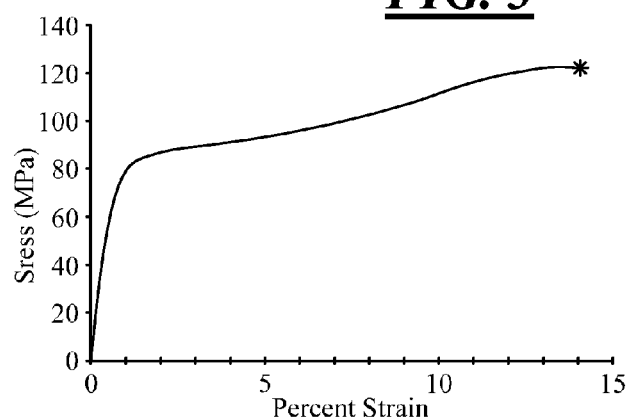
FIG. 4
FIG. 5

ANTI-INTRUSION BEAM FOR VEHICLE DOOR ASSEMBLY

TECHNICAL FIELD

The technical field generally relates to vehicle door assemblies and anti-intrusion beams for vehicle door assemblies and methods of making the same.

BACKGROUND

Vehicle door assemblies, such as automotive side door assemblies, are ordinarily equipped with anti-intrusion beams to reinforce the door structure and help protect occupants against side impacts. The anti-intrusion beams commonly span the length of the door at about a vertical midsection of the door. The anti-intrusion beams are conventionally made of steel by a stamping metalworking process.

SUMMARY OF EXEMPLARY EMBODIMENTS OF THE INVENTION

One exemplary embodiment includes a product which may include an anti-intrusion beam for a vehicle door assembly. The anti-intrusion beam may may include a composite material comprising a fiber reinforcement. The fiber reinforcement may have multiple fibers that may be oriented at an angle between about 35 and 55 degrees with respect to a lengthwise dimension of the anti-intrusion beam.

One exemplary embodiment includes a product which may include a vehicle door assembly. The vehicle door assembly may include an anti-intrusion beam that may be connected to the vehicle door assembly. The anti-intrusion beam may be formed of a composite material that may comprise a glass fiber reinforcement. The glass fiber reinforcement may have multiple weft and warp glass fibers that may be oriented at an angle of about 90 degrees with respect to each other, and may each be oriented at an angle between about 35 and 55 degrees with respect to a lengthwise dimension of the anti-intrusion beam. The anti-intrusion beam may have a generally corrugated cross-sectional profile.

One exemplary embodiment includes a method which may include forming an anti-intrusion beam for a vehicle door assembly. The forming may comprise providing a composite material with a fiber reinforcement that may have multiple fibers. The forming may also comprise orienting the fibers at an angle between about 35 and 55 degrees with respect to a lengthwise dimension of the anti-intrusion beam.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 1 is a partially exploded view of an exemplary embodiment of a vehicle door assembly.

FIG. 2 is a perspective view of an exemplary embodiment of an anti-intrusion beam.

FIG. 3 is a sectional view taken at line 3-3 in FIG. 2.

FIG. 4 is an enlarged view taken at circle 4 in FIG. 1 of an exemplary fiber reinforcement.

FIG. 5 is an exemplary stress-strain graph.

DETAILED DESCRIPTION OF EXEMPLARY EMBODIMENTS

The following description of the embodiment(s) is merely exemplary (illustrative) in nature and is in no way intended to limit the invention, its application, or uses.

The figures illustrate an exemplary embodiment of an anti-intrusion beam 10 used in a vehicle door assembly such as an automotive side door assembly 12. The anti-intrusion beam 10 may be formed of a composite material which may include a fiber reinforcement 14. The fiber reinforcement 14 may be constructed and arranged to increase energy absorption, increase stiffness, and decrease weight in the anti-intrusion beam 10 as compared to a conventional anti-intrusion beam made of steel by a stamping metalworking process.

The automotive side door assembly 12 may be a driver-side, passenger-side, rear door, or another door of an automobile. In one exemplary embodiment illustrated by FIG. 1, the automotive side door assembly 12 may include an outer panel 16 and an inner panel 18. In select embodiments, the outer panel 16, the inner panel 18, or both, may include magnesium and/or aluminum, or an alloy thereof. The inner panel 18 may include a hinge wall 20 and a latch (not shown). In one embodiment, the anti-intrusion beam 10 may be made as a separate component than the outer and inner panels 16, 18 and may be connected to the inner panel via adhesive bonding. In another embodiment, the anti-intrusion beam 10 may be made as an integral part of the inner panel 16, and may be molded integrally with the inner panel.

Referring to FIGS. 1-3, the anti-intrusion beam 10 may reinforce the automotive side door assembly 12 and may help protect occupants of the automobile against side impacts. The anti-intrusion beam 10 may have a body 21 with lengthwise dimension L and a widthwise dimension W. The anti-intrusion beam 10 may have a first flange 22 extending in an inboard direction to a first free end 24, and may have a second flange 26 extending in an inboard direction to a second free end 28. In cross-sectional profile, the anti-intrusion beam 10 may have a corrugated or double-hat shape. The shape may comprise a first and second ridge 30, 32 on an inboard side 34, and may comprise a third ridge 36 and a first and second channel 38, 40 on an outboard side 42.

In select embodiments, the anti-intrusion beam 10 may be formed of the composite material which may include the fiber reinforcement 14. The composite material may also include an epoxy resin, a polyester resin, a vinyl ester resin, or a polyurethane resin. Referring to FIG. 4, the fiber reinforcement 14 may include multiple fibers 44 such as glass or carbon fibers. In one embodiment the fibers 44 may include an equal number of fibers in a weft and warp plain weave, and may include multiple weft fibers 46 and multiple warp fibers 48 interweaved under and over each other. The weft and warp fibers 46, 48 may be oriented about 90° with respect to each other, and may be oriented to define an angle Θ with respect to the lengthwise dimension L. The angle Θ may range between about 35° and 55°, and in one embodiment may be about 45°. Angle values outside of that range may, in some cases, decrease energy absorption.

The fiber reinforcement 14 may include two to six separate layers of fabric pieces or plies located between the inboard and outboard sides 34, 42. In one embodiment, the fiber reinforcement 14 may include three separate layers of fabric pieces. Each fabric piece includes its own fibers 44 which may be oriented at about 90° with respect to each other, and between about 35° and 55°, or about 45° with respect to the lengthwise dimension L. Each fabric piece may be a 24 oz/yard² piece, a 12 oz/yard², or another suitable piece.

In the case of glass fibers, the anti-intrusion beam 10 may have a thickness ranging between about 1.5 and 2.0 mm, and in the case of carbon fibers, the thickness may be about 1.0 to 1.8 mm. Of course other thickness values are possible. The thicker the anti-intrusion beam 10, the more energy the anti-intrusion beam 10 can absorb and the stiffer the anti-intrusion beam. Also, the deeper the channels 38, 40 and more pronounced the ridges 30, 32, 36, the stiffer the anti-intrusion beam 10.

In one embodiment, the anti-intrusion beam 10 may be manufactured by a liquid composite molding process. The process may involve injecting liquid resin into a dry fiber preform, and may include resin transfer molding and vacuum-assisted resin transfer molding. In other manufacturing processes, fabric pieces may be pre-impregnated with resin and then compression molded or cured in an autoclave.

FIG. 5 shows an exemplary stress-strain graph for an exemplary tensile bar representing one embodiment of the anti-intrusion beam 10. All experiments may not necessarily yield these exact results. The tensile bar had three fabric pieces of 24 oz/yard² of fiber reinforcement with glass fibers oriented at 45° with respect to the lengthwise dimension. The thickness of tensile bar was about 1.8 mm.

The above description of embodiments of the invention is merely exemplary in nature and, thus, variations thereof are not to be regarded as a departure from the spirit and scope of the invention.

What is claimed is:

1. A product comprising:
    an anti-intrusion beam for a vehicle door assembly, the anti-intrusion beam comprising a composite material comprising a fiber reinforcement, the fiber reinforcement having a plurality of fibers oriented at an angle between about 35 and 55 degrees with respect to a lengthwise dimension of the anti-intrusion beam.

2. A product as set forth in claim 1 wherein the angle is about 45 degrees.

3. A product as set forth in claim 1 wherein the fibers comprise glass.

4. A product as set forth in claim 1 wherein the fibers comprise carbon.

5. A product as set forth in claim 1 wherein the composite material comprises 2 to 6 layers of fiber reinforcement, each layer having fibers oriented at an angle between about 35 and 55 degrees with respect to the lengthwise dimension of the anti-intrusion beam.

6. A product as set forth in claim 5 wherein the composite material comprises 3 layers of fiber reinforcement.

7. A product as set forth in claim 1 wherein the anti-intrusion beam has a corrugated cross-sectional profile with a pair of ridges on an inboard side of the anti-intrusion beam.

8. A product as set forth in claim 1 wherein the composite material comprises an epoxy resin, a polyester resin, a vinyl ester resin, or a polyurethane resin.

9. A product comprising:
    a vehicle door assembly including an anti-intrusion beam connected to the vehicle door assembly, the anti-intrusion beam comprising a composite material comprising a glass fiber reinforcement, the glass fiber reinforcement having a plurality of weft and warp glass fibers oriented at an angle of about 90 degrees with respect to each other and each oriented at an angle between about 35 and 55 degrees with respect to a lengthwise dimension of the anti-intrusion beam, the anti-intrusion beam having a generally corrugated cross-sectional profile.

10. A product as set forth in claim 9 wherein the angle with respect to the lengthwise dimension of the anti-intrusion beam is about 45 degrees.

11. A product as set forth in claim 9 wherein the composite material comprises 2 to 6 layers of glass fiber reinforcement, each layer having glass fibers oriented at an angle of about 90 degrees with respect to each other and each oriented at an angle between about 35 and 55 degrees with respect to the lengthwise dimension of the anti-intrusion beam.

12. A product as set forth in claim 11 wherein the composite material comprises 3 layers of glass fiber reinforcement.

13. A product as set forth in claim 9 wherein the composite material comprises at least one of an epoxy resin, a polyester resin, a vinyl ester resin, or a polyurethane resin.

14. A method of making a product, the method comprising:
    forming an anti-intrusion beam for a vehicle door assembly comprising providing a composite material with a fiber reinforcement having a plurality of fibers, orienting the fibers at an angle between about 35 and 55 degrees with respect to a lengthwise dimension of the anti-intrusion beam.

15. A method as set forth in claim 14 wherein orienting the fibers comprises orienting the fibers at an angle of about 45 degrees.

16. A method as set forth in claim 14 wherein the fibers comprise glass.

17. A method as set forth in claim 14 wherein the fibers comprise carbon.

18. A method as set forth in claim 14 wherein the composite material comprises 2 to 6 layers of fiber reinforcement, and orienting the fibers comprises orienting the fibers in each layer at an angle between about 35 and 55 degrees with respect to the lengthwise dimension of the anti-intrusion beam.

19. A method as set forth in claim 14 comprising forming a corrugated cross-sectional profile in the anti-intrusion beam.

* * * * *